Patented June 16, 1942

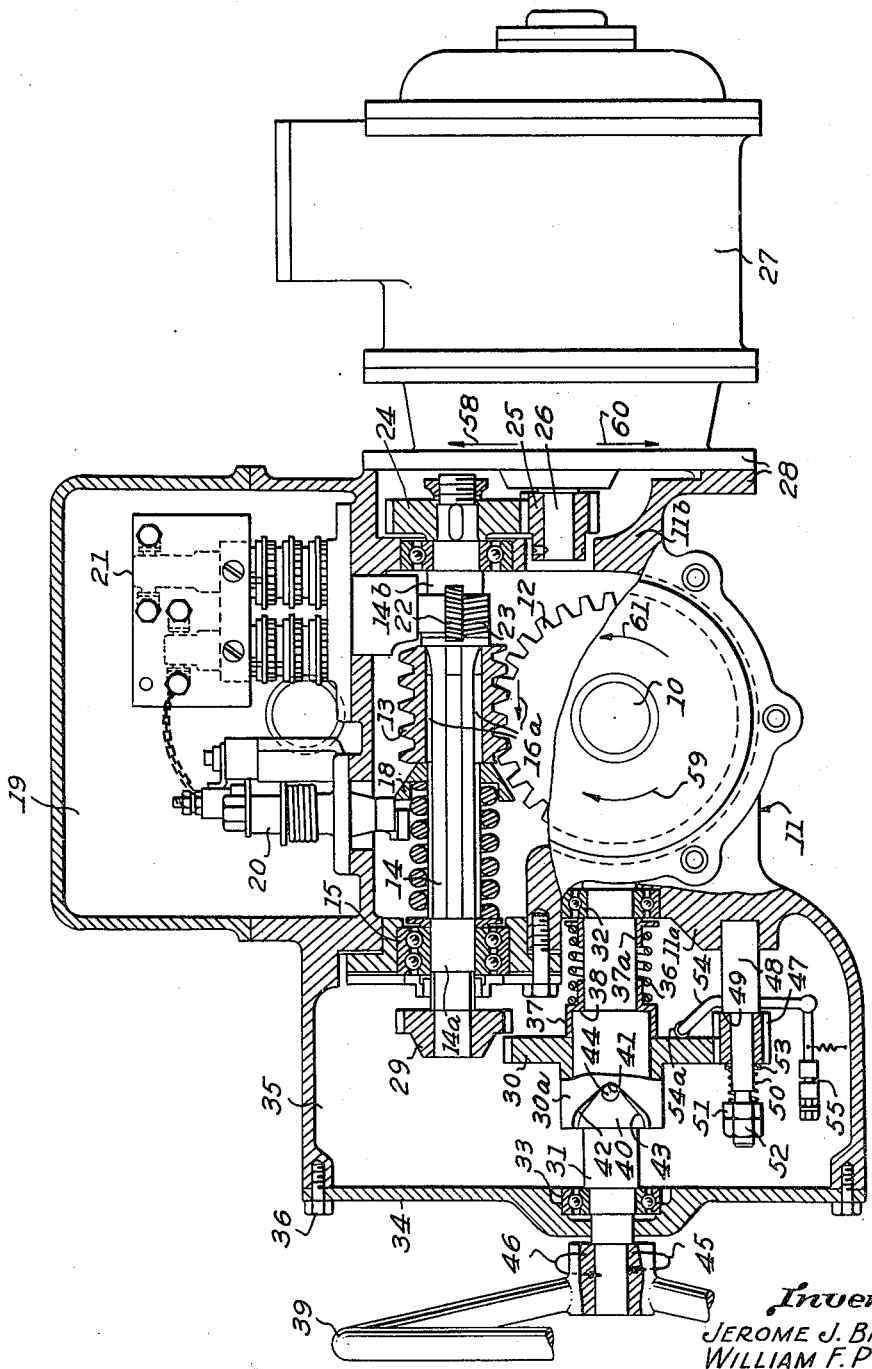

2,286,597

UNITED STATES PATENT OFFICE 2,286,597

VALVE CONTROL

Jerome J. Bruckel, Philadelphia, Pa., and William F. Plume, Audubon, N. J., assignors to Philadelphia Gear Works, Inc., Philadelphia, Pa., a corporation of Pennsylvania Application August 4, 1941, Serial No. 405,412

4 Claims. (Cl. 74—407)

This invention relates to power actuated valve control mechanism. More specifically this relates to means in conjunction with such mechanism, for effecting the changing over or conditioning of the mechanism for power operation and manual operation respectively of the valve.

In the patent to Ball No. 1,114,013, for example, there has been described a device of this general class, comprising certain mechanical means for selectively changing from manual to power operation and vice versa, for the purpose of avoiding a coincidence of manual and power operation, whereby an operator manipulating the valve stem by means of a hand-wheel may come to grief by the rotation thereof due to power being started by remote control. In that patent a clutching and declutching device is so constructed that a special clutch lever must be actuated by the operator in order to operatively connect the hand-wheel with the valve stem, without necessarily disconnecting the power drive, which, if remote control impulse is given to the power drive, would automatically disconnect the manual drive connection with the hand-wheel, thus protecting the operator from potential injury. Another disclosure of means for preventing simultaneous manual and power actuation of the valve control mechanism is found in the British patent to Danson No. 324,780, printed in 1930. It provides contact or switch means whereby the power is automatically cut off while the valve is being operated manually, to be automatically restored as the manual operation is discontinued. In the case of the British patent the automatic conditioning of the control mechanism for manual and power operation respectively incident to the operation of the hand-wheel, is effected by imparting to the hand-wheel and the shaft with which the hand-wheel is rigidly connected a bodily axial shifting movement whereby the shaft is clutched or declutched with respect to control mechanism.

Consequently it is among the objects of this invention to provide means whereby the change from power operation to manual operation of the valve can be effected conveniently, rapidly, safely, and in a manner which to some extent is automatic, namely, in so far as the operation or the release of the hand-wheel by the operator automatically conditions the control mechanism correspondingly for power—or for manual operation. Another object is to provide such a mechanism that is economical to build.

These objects are attained according to this invention by automatically coupling with the operation of the hand wheel, an axial in-and-out-of-mesh movement of a driving gear in the control mechanism. That is to say, manual operation of the hand wheel automatically causes the gear to shift from idleness into active mesh, while the release of the hand-wheel by the operator correspondingly shifts the gear from its active driving engagement back to idle position.

According to one feature there is provided a loose operating connection or cam connection between the hand-wheel and the shiftable gear for axially urging the gear against suitable spring pressure as soon as the hand-wheel is turned. Means are provided for yieldably engaging the gear so as to impose upon it a certain resistance to rotation or drag, in order to insure axial movement and thereby proper engagement of the gear with its companion gear in the control mechanism. Such drag or yieldable detent means, according to a special feature of refinement are adjustable as to their degree of yieldability. Consequently, according to such refinement, these means comprise an idler pinion meshing with the shiftable gear, and drag means for adjusting the resistance of the idler pinion to rotation. The drag means may then be adjusted properly to establish sufficient resistance to the rotation of the idler and thus of the shiftable gear to prevent rotation of the latter while shifting, but not strong enough to prevent rotation after the gear is shifted into mesh with the companion gear.

According to another feature, a loose or slip connection between the hand-wheel and the shiftable gear is such that a cam member fixed on the hand-wheel shaft urges the axially shiftable gear on that shaft into operative engagement with its companion gear in the control mechanism.

The invention possesses other objects and features of advantage, some of which, with the foregoing, will be set forth in the following description. In the following description and in the claims, parts will be identified by specific names for convenience, but they are intended to be as generic in their application to similar parts as the art will permit. In the accompanying drawing there has been illustrated the best embodiment of the invention known to me, but such embodiment is to be regarded as typical only of many possible embodiments, and the invention is not to be limited thereto.

The novel features considered characteristic of my invention are set forth with particularity in the appended claims. The invention itself, however, both as to its organization and its method of operation, together with additional objects and advantages thereof, will best be understood from the following description of a specific embodiment when read in connection with the accompanying drawing in which:

Fig. 1 is a cross-section through the mechanism showing in plan view the valve stem, the drive means therefor and the mechanism permitting the optional use of power- and manual-drive.

The improvements of this invention according to the drawing figure are shown to be embodied in a valve control mechanism, the known parts of which comprise a threaded valve stem 10, and an operating nut engaging the valve stem, the rotation of which nut in the one or the other direction raises or lowers the valve stem correspondingly. This well known nut, although not visible in the view of the drawing, is confined against axial displacement with respect to a housing 11 that contains the control mechanism. The operating nut in question may herein be identified with a worm gear 12 with which it rotates. Further parts of this known portion of the mechanism are worm 13 having driving engagement with the worm gear 12, a worm shaft 14 being journaled in the walls 11a and 11b of the housing 11 by way of bearings 15 and 16 supporting respective end portions 14a and 14b of the worm shaft. The worm 13 is slidable on the shaft 14 by reason of a splined connection 16a between the worm and the worm shaft. The sliding movement of the worm is yieldably resisted by a compression coil spring 17 surrounding the shaft and endwise confined between the bearing 15 and a thrust collar 18 which latter is interposed between the coil spring 17 and the worm 13. This slidable worm 13 and the resisting coil spring 17 are known to function in such a manner that in case a predetermined excess thrust or load is imposed upon the valve stem due to some obstruction during the closing movement of the valve or due to the valve reaching its seat, the resultant axial reaction thrust upon the worm will compress the spring 17 as the worm is forced to shift axially in the direction of arrow 16a a distance sufficient to actuate a limit switch device engaged by the thrust collar 18, to stop the power drive. This switch device is herein called a torque-responsive switch, and its function as a safety device of such a sliding worm is fully described in the Ball Patent No. 1,114,013. Switch devices to stop the power drive automatically at the ends of the opening and closing movements of the valve are herein shown to be provided in the chamber 19 of the housing 11, the torque-responsive switch being shown at 20, a limit switch to terminate the valve opening movement being designated by numeral 21. The limit switch 21 is shown to be geared to the worm shaft 14 as by a pair of special gears 22 and 23.

The worm shaft 14 has fixed to its free end portion 14b a gear 24 meshing with a drive pinion 25 fixed on the armature shaft 26 of a drive motor 27 attached as by a flange connection 28 to the wall portion 11b of housing 11.

The following is a description of that part of the mechanism, which may be said to embody improvements according to the invention. At its free end 14a the worm shaft 14 carries a gear 29 to be engaged or released by an axially shiftable gear 30 mounted upon a shaft 31 which extends parallel to the worm shaft 14. One end of the shaft 31 is journaled in a bearing 32 in the wall 11a of the housing 11, the other end portion of the shaft 31 having a bearing 33 mounted in a cover plate 34 closing a chamber 35 forming part of the housing 11, the shaft 31 thus being confined against axial movement between the wall portion 11a and the cover plate 34. The cover plate 34 is fastened as by bolts 36 to the walls of the chamber 35. A compression coil spring 36 encircles the shaft 31 and extends between the bearing 32 and the shiftable gear 30. A thrust member or sleeve 37 fits over a shoulder 38 on the shaft 31 and is interposed between the coil spring 36 and the shiftable gear 30. This thrust member 37 is not intended to rotate with the gear 30 although it is longitudinally slidable on the shaft 31 and consequently it is merely intended to take up the actual thrust of the coil spring 36 without transmitting rotation. Another or companion thrust member 37a is interposed between the other end of spring 36 and the wall 11a of the housing. The end of the shifting movement of the gear 30 is determined by the stud 44 reaching that portion of the cam face 42 or 43 parallel to the center line of the shaft 31.

The shaft 31 carries a hand-wheel 39 the rotation of which in either direction automatically causes the shiftable gear 30 to move axially against the pressure of the coil spring 36 and into engagement with the gear 29. Such axial movement of the gear 30 incident to the rotation of the hand-wheel 39 is effected due to a loose or slip, or lost motion connection involving cam effect between the shaft 31 and the shiftable gear 30. This slip connection comprises a notchlike cutout 40 in the hub portion 30a of the gear 30, providing a vortex 41 and a pair of oppositely inclined sloping cam faces 42 and 43, and a stud or cam portion 44 fixed on the shaft 31.

When the hand-wheel 39 is released, and because the shaft 31 is axially non-shiftable, the coil spring 36 will urge the gear 30 to move axially outwardly (that is, towards the hand-wheel 39) and cause the cam stud 44 to lodge in the vortex 41 of the notchlike cutout 40. When the hand wheel and consequently the shaft 31 are rotated in the direction of arrow 45 (that is, clockwise) for opening the valve, it will be seen that the cam stud 44 will ride up on the cam face 43 and thus shift the gear 30 axially against the pressure of coil spring 36 and into mesh with gear 29, provided that sufficient drag is imposed upon the gear 30 to prevent its rotation during such shifting movement. Correspondingly, when the hand-wheel 39 is turned in the direction of arrow 46 (that is, counter-clockwise) for closing the valve, the cam stud 44 will be forced up the cam face 42, thereby again shifting the gear 30 axially against the pressure of coil spring 36 and into mesh with the gear 29, provided sufficient drag is imposed upon the gear 30 to prevent its rotation during such shifting. It will be understood that the drag imposed upon the shiftable gear 30 should be adequate to insure the proper functioning of the axial shifting movement of the gear 30 into mesh with gear 29, but on the other hand, the drag should be small enough to permit the gear 30 to be rotated through the operation of the hand-wheel 39 without undue resistance after the shiftable gear 30 has engaged the gear 29.

As regards the provision of the means for yieldably impeding the rotation of the shiftable gear 30, herein called drag means, it is a part of this invention and a refinement to provide an idler pinion 47 to mesh with the shiftable gear 30, and rotatably mounted on a stud 48 fixed in the wall 11ᵃ of housing 11. This idler pinion 47 is held down upon a shoulder 49 of the stud 48 by a coil spring 50 surrounding the top portion of this stud. This spring 50 is endwise confined and compressed between the pinion 47 and a nut 51 with lock nut 52. With the aid of these nuts, the degree of compression of the spring 50 and hence its pressure against the pinion 47 can be adjusted, incidentally, by way of an interposed pressure and antifriction ring 53. At any rate this coil spring 50 imposes what is herein termed an adjustable drag upon the pinion 47, which drag is passed on to the shiftable gear 30 because of the meshing of these two gears with one another. It will therefore also be noted that the width of the axially non-shiftable pinion 47 is about twice that of the axially shiftable gear 30, so as to insure interengagement of these two gears at all times, that is, during both extreme shift positions of the gear 30.

It will further be noted that an electric switch arm 54 provided with cam roller 54ᵃ touches the gear 30 and is consequently actuated by the axial movement of the gear in such a manner as to actuate a switch 55 to cut the power current whenever manual operation of the hand-wheel shifts the gear 30 into engagement with its companion gear 29, thus precluding the power drive of the valve to be started while an operator is handling the hand-wheel 39.

Operation

From the foregoing it will be understood that unless manually operated, the hand-wheel 39 remains disengaged from the valve operating mechanism since the gears 29 and 30 are then out of mesh with one another. In case the operating mechanism is to be power operated, that is, by starting the motor 27 by remote control, for opening the valve, the motor would be caused to run in the direction of arrow 60, causing the motor pinion 25 to turn the gear 24 and thereby the worm shaft 14 and the worm 13 so as to rotate the worm gear 12 in the direction of arrow 61. In that condition of the mechanism the motor current functions because the safety switch device 55 is closed due to the then out-of-mesh position of the slidable gear 30. The limit switch device 21 terminates the opening movement of the valve by shutting off the motor current at a predetermined point. Correspondingly, in order to close the valve, the motor 27 is caused to run in the direction of arrow 58, thereby turning the worm shaft 14 and the worm 13 so as to rotate the worm gear 12 in the direction of arrow 59. After the valve reaches its closed position, the torque-responsive switch device 20 will function to shut off the motor current after the valve seating pressure has reached a substantially predetermined degree. That is to say, after the valve has seated, if the motor continues, the driving reaction will cause the worm 13 to slide on the shaft 14 against the pressure of the coil spring 17, until the collar 18 actuates the switch arm 20ᵃ of the torque-responsive switch device 20, thus shutting off the motor current. The self-locking character of the threaded valve stem 10 will keep the valve seated under a pressure thus established and substantially corresponding to the degree of compression of the coil spring 17. Again, this closing operation by the motor power is realized only because of the switch 55 being closed due to the then out-of-mesh position of the shiftable gear 30.

If it is desired to operate the valve manually, in order to open the same, the hand-wheel 39 is turned in the direction of arrow 45, that is, in a clockwise direction. This will cause the cam member 44 to move along the cam face 43 of the hub portion 33ᵃ of the gear 30, the gear thus being shifted axially on the shaft 31 against the pressure of the coil spring 36 and into mesh with the gear 29. This axial shifting movement of the gear 30 is facilitated by the idler pinion 47 being yieldably held by spring 50. The gear 30 is thus axially shifted a distance corresponding to the length of the cam face 43 and substantially until the thrust collar 37 abuts the companion thrust collar 37ᵃ, at which time the gear 30 is properly engaged with the gear 39. Further rotation of the hand-wheel 39 will then overcome the drag resistance of the idler pinion 47, and rotate the worm shaft 14 and the worm 13, and cause the worm gear 12 to rotate in the direction of arrow 59, so as to open the valve. However, as soon as the hand-wheel 39 is released by the operator, the spring 36 will push the gear 30 back out of mesh with the gear 26 and to its zero position in which the cam member 44 lodges in the vortex 41 of the cam faces 42 and 43.

In order to close the valve by manual operation, the hand-wheel 39 is turned in the direction of arrow 46, that is, in counter-clockwise direction, causing the cam member 44 to move along the cam face 42, thus shifting the gear 30 axially into engagement with gear 29, and consequently rotating the worm shaft 14, the worm 13, and thereby rotating the worm gear 12 in the direction of arrow 59 as to close the valve, substantially as just described in connection with the clockwise rotation of the hand-wheel 39.

It will be noted that in each instance of manual operation, that is to say, in the case of clockwise as well as counter-clockwise rotation of the hand-wheel 39, the very shifting movement of the gear 30 into mesh with the gear 29 will coincidentally actuate switch 55 because of the engagement of the switch cam roller 54ᵃ upon the side of gear 30. Consequently, whenever the valve is actuated manually, that is, by operation of the hand-wheel 39, the motor circuit will be interrupted, thus safeguarding the operator against injury by the motor 27 getting started by remote control. But whenever the hand-wheel 39 is released by the operator, the switch 55 will automatically close, thereby conditioning the mechanism for power operation, in that the motor 27 may then be started by remote control.

We claim:

1. In a valve control having motor-operated valve-actuating mechanism including a valve driving shaft, a gear on said shaft, a hand-wheel, a gear driven by said hand-wheel and normally out of mesh with said gear on the driving shaft, means operated by the rotation of the hand-wheel for moving one of said gears axially into mesh with the other gear so that said driving shaft may be rotated by said hand-wheel, rotation resisting means for imposing a drag upon the gear being axially moved, which means comprise an idler pinion meshing with the axially movable gear and adjustable spring means engaging and pressing upon said idler pinion to impose thereon a drag to be transmitted to the axially movable gear, and automatic means for moving said movable gear axially out of mesh with said other gear when manually applied torque is removed from the hand-wheel.

2. In a valve control having motor-operated valve-actuating mechanism including a valve driving shaft, a gear on said shaft, a hand-wheel, a gear driven by said hand-wheel and normally out of mesh with said gear on the driving shaft, a lost motion cam connection between the hand-wheel and the last mentioned gear for moving the same into mesh with the first mentioned gear when the hand-wheel is rotated, means for yieldably holding said last mentioned gear against rotation during initial rotation of said hand-wheel whereby the gear is adapted by the operation of said lost motion cam connection to move axially into engagement with the gear on the driving shaft, means for limiting the axial movement of said axially movable gear and causing said gear to rotate simultaneously with said hand-wheel and to drive the gear on the driving shaft, a spring placed under a load when said cam connection causes said gears to mesh with one another and causing reverse effect of said cam connection and thereby unmeshing of the gears when manually applied torque is removed from the hand-wheel.

3. In a valve control having motor operating valve actuating mechanism, including a valve driving shaft, a gear on said shaft, an axially non-shiftable shaft parallel to said valve driving shaft, a gear axially shiftable on said non-shiftable shaft into and out of mesh with said first mentioned gear, a lost motion cam connection between the hand-wheel and said shiftable gear, which connection comprises a notch-like cam face having a vortex portion, and oppositely sloping cam faces, and a cam member rotating with the hand-wheel and normally lodging in said vortex portion, said cam member being adapted to axially shift said shiftable gear into mesh with the other gear due to the cam member engaging the one or the other sloping cam face, when manual torque is applied to the hand-wheel in the one or the other direction, and means for automatically shifting the shiftable gear out of mesh with the other gear when the manually applied torque is removed from the hand wheel.

4. Mechanism according to claim 3, with the addition of rotation resisting means for imposing a drag upon the gear being axially moved, which means comprise an idler pinion meshing with the shiftable gear, and adjustable spring means engaging and pressing upon one side of said idler pinion to impose thereon a drag to be transmitted to the axially movable gear.

JEROME J. BRUCKEL.
WILLIAM F. PLUME.